AUTOMATIC PHONOGRAPH WITH COIN CONTROLLED MECHANISM

Filed Oct. 29, 1959 9 Sheets-Sheet 1

INVENTORS
David C. Rockola,
Ralph Petri and
Howard Sifferle
By Horton, Davis, Brewer & Brugman
Attys INVENTORS
David C. Rockola,
Ralph Petri and
Howard Sifferle
By Horton, Davis, Brewer & Brugman
Attys.

INVENTORS
David C. Rockola
Ralph Petri and
Howard Sifferle
By Norton, Davis, Brewer & Brugman
Att'ys

AUTOMATIC PHONOGRAPH WITH COIN CONTROLLED MECHANISM

Filed Oct. 29, 1959 9 Sheets-Sheet 4

INVENTORS
David C. Rockola,
Ralph Petri and
Howard Sifferle
By Horton, Davis, Brewer & Brugman
Attys.

March 26, 1963 D. C. ROCKOLA ETAL 3,082,853

AUTOMATIC PHONOGRAPH WITH COIN CONTROLLED MECHANISM

Filed Oct. 29, 1959 9 Sheets-Sheet 5

INVENTORS
David C. Rockola,
Ralph Petri and
Howard Sifferle
By Horton, Davis, Brewer & Brugman
Att'ys.

AUTOMATIC PHONOGRAPH WITH COIN CONTROLLED MECHANISM

Filed Oct. 29, 1959 9 Sheets-Sheet 6

INVENTORS
David C. Rockola,
Ralph Petri and
Howard Sifferle
By Horton, Davis, Brewer & Brugman
Attys.

March 26, 1963 D. C. ROCKOLA ETAL 3,082,853

AUTOMATIC PHONOGRAPH WITH COIN CONTROLLED MECHANISM

Filed Oct. 29, 1959 9 Sheets-Sheet 7

INVENTORS
David C. Rockola,
Ralph Petri and
Howard Sifferle
By Horton, Davis, Brewer & Brugman
Att'ys.

Inventors:
David C. Rockola
Ralph Petri
Howard Sifferle
BY Hofgren, Davis,
Brenner & Brugman
Attys

AUTOMATIC PHONOGRAPH WITH COIN CONTROLLED MECHANISM

Filed Oct. 29, 1959 9 Sheets-Sheet 9

INVENTORS
David C. Rockola
Ralph Petri and
Howard Sifferle
By Hoston, Davis, Brewer & Brugman
Att'ys United States Patent Office 3,082,853
Patented Mar. 26, 1963

3,082,853
AUTOMATIC PHONOGRAPH WITH COIN CONTROLLED MECHANISM

David C. Rockola, Ralph Petri, and Howard Sifferle, Chicago, Ill., assignors to Rock-Ola Manufacturing Corporation, Chicago, Ill., a corporation of Delaware Filed Oct. 29, 1959, Ser. No. 849,546
17 Claims. (Cl. 194—15)

The present invention relates to automatic phonographs.

The invention has to do more particularly with means incorporated in a coin controlled automatic phonograph whereby to accommodate records of different "values," i.e., records of different lengths of playing periods and consequently requiring deposit of different amounts of money for their playing.

The amount of money required for playing a single record may be, for example, 10¢, which may be a minimum amount, in general acceptance. This money value may represent a standard or basic record, but other records represent other and higher values, such as what are known as "extended play" records, i.e., those that play for a longer period of time than the standard records and require deposit of more money for playing them.

A broad object of the invention is to provide novel apparatus in a coin controlled automatic phonograph capable of accommodating records of different value representations at one time and of playing them in mixed arrangement or succession according to the desire of the patron playing the phonograph.

Another object is to provide a coin controlled automatic phonograph capable of accommodating records of different money value representations, having novel means for accumulating credit according to random deposit of coins of different denominations, and enabling playing of records of different value representations when played in random order or succession, the total credit accumulated being cancelled according to the values represented by the respective records.

A further object is to provide a coin controlled automatic phonograph having novel mechanical credit accumulating means of the general character above noted, the credit accumulating means being electrically operated in response to coins of different denominations deposited in random order, and from which the credit is cancelled according to records of different value representations played in random order.

An additional object is to provide an automatic phonograph capable of accommodating records of different value representations respectively playable in response to insertion of coins of corresponding different denominational values, this representing a scale of charges, wherein means in provided for selectively altering the scale of charges so as to render the records playable in response to insertion of coins of different corresponding values.

A further object is to provide auxiliary credit accumulator means specially adaptable to an automatic phonograph having built-in credit accumulator means and acting on the built-in credit accumulator means in response to insertion of coins of different denominations than those receivable in the built-in credit accumulator means.

A still further object is to provide an auxiliary credit accumulator means of the foregoing general character having means for varying the amount of accumulated credit represented in response to insertion of coins of given denomination, so as to provide predetermined amounts of credit for the respective coins receivable therein.

Other objects and advantages of the invention will appear from the following detailed description taken in conjunction with the accompanying drawings in which—

Figure 17:
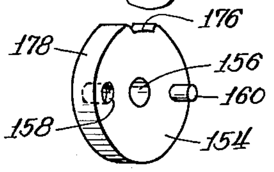
Figure 18:
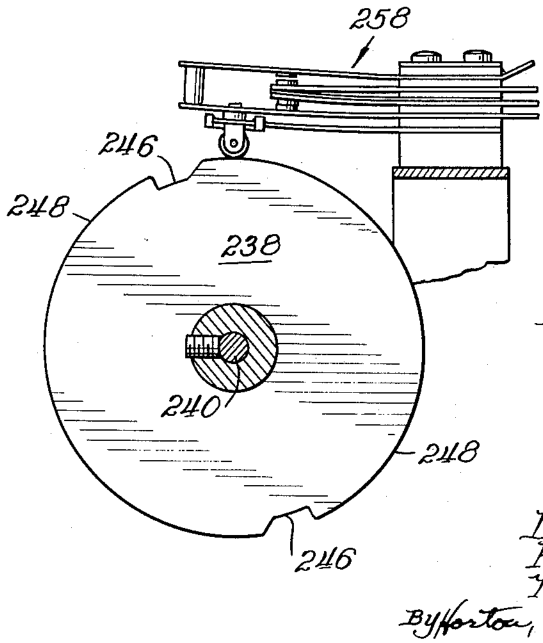
Figures 15, 15A:
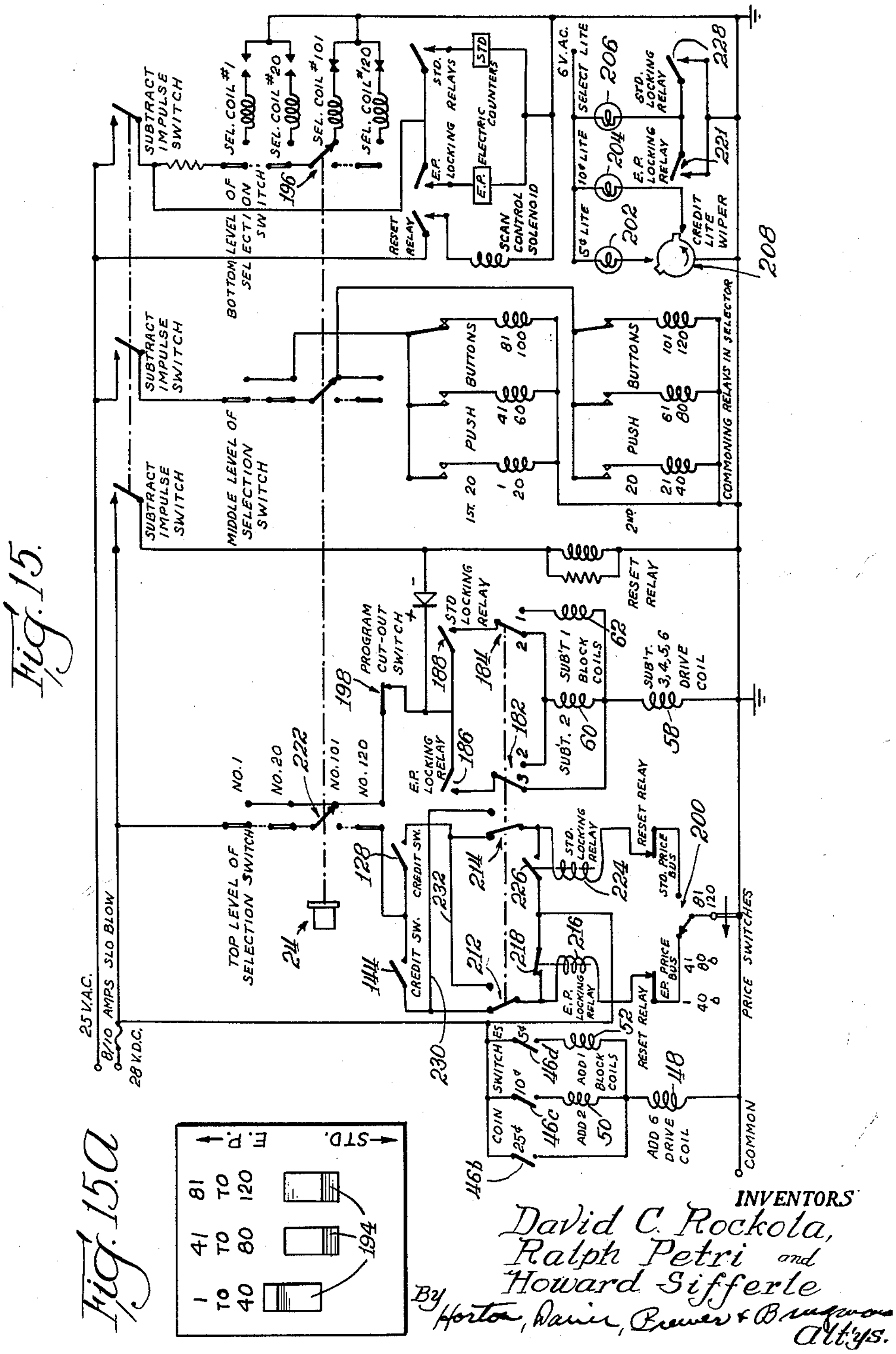
FIG. 15 is a diagram of a portion of the electric circuit utilized in the phonograph.
Figure 16:
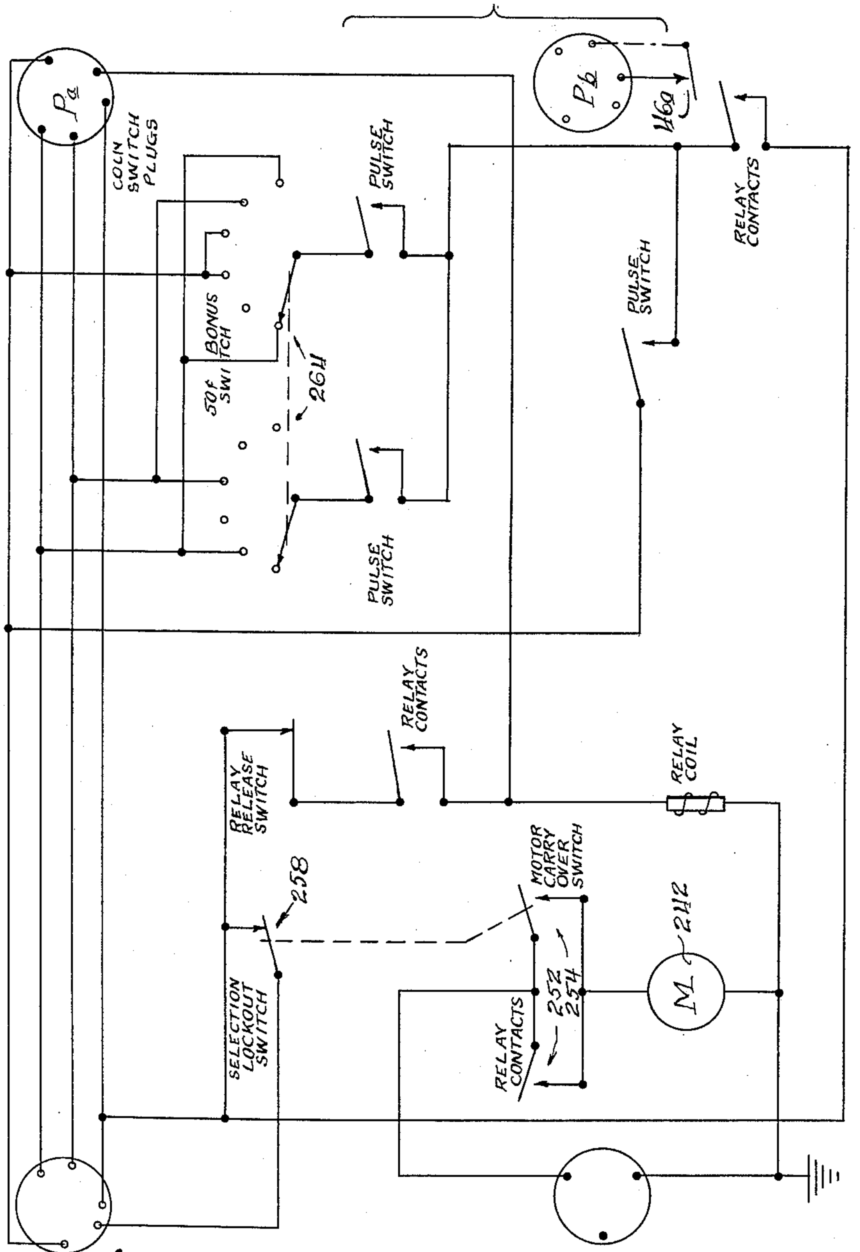
Figures 19, 20:
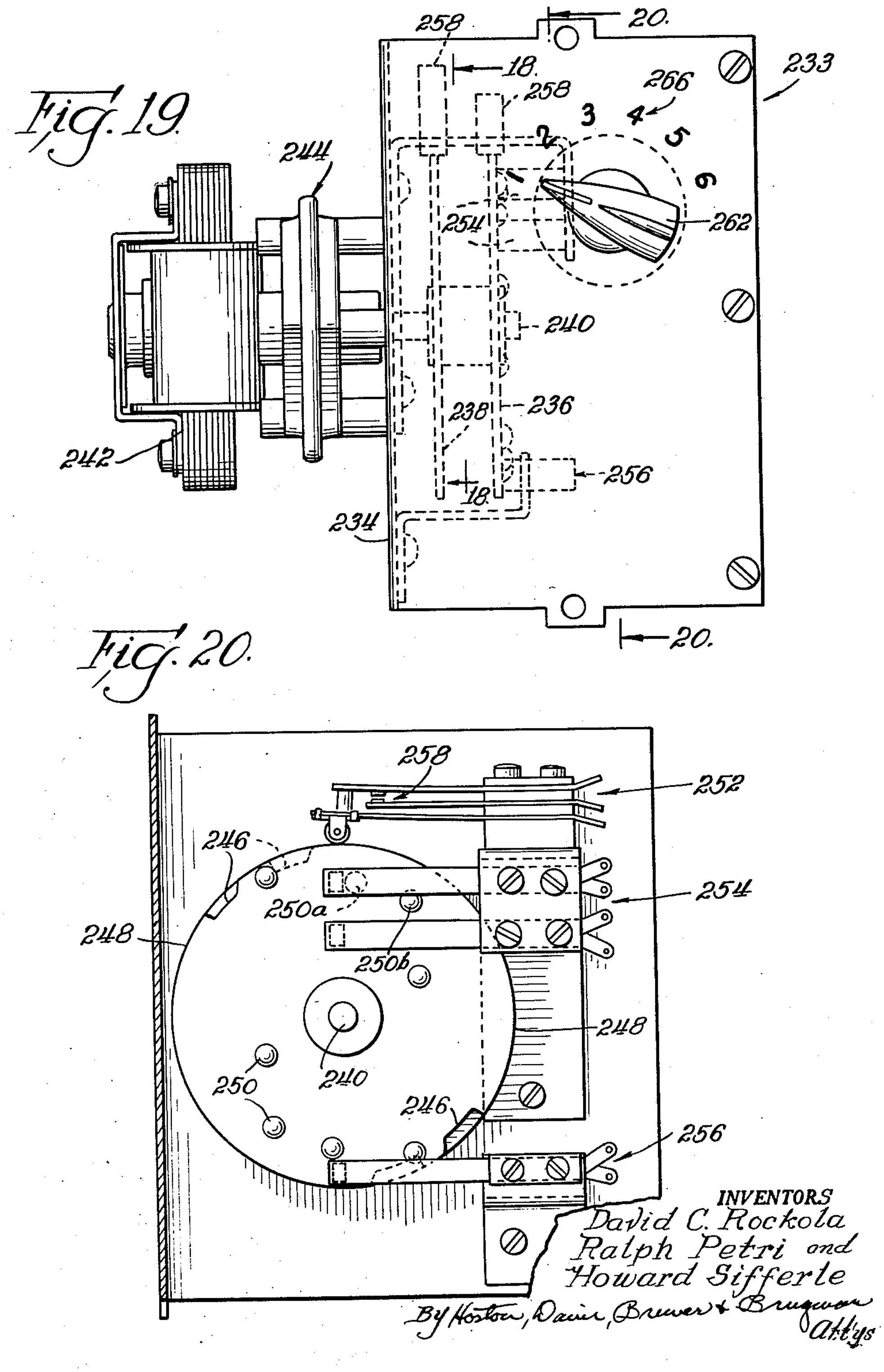

FIG. 15*a* is a plan view of switch control buttons for making settings for standard and EP records;

FIG. 16 is a diagram of the electrical circuit involved in connection with the auxiliary credit accumulator of FIGS. 18, 19 and 20;

FIG. 17 is a detail perspective view of an adjustable cam member shown in FIGS. 9–12;

FIG. 18 is a detail view of a portion of the auxiliary credit accumulator, and taken on line 18—18 of FIG. 19;

FIG. 19 is an elevational view of the auxiliary credit accumulator; and

FIG. 20 is a view taken on line 20—20 of FIG. 19.

Figure 2:
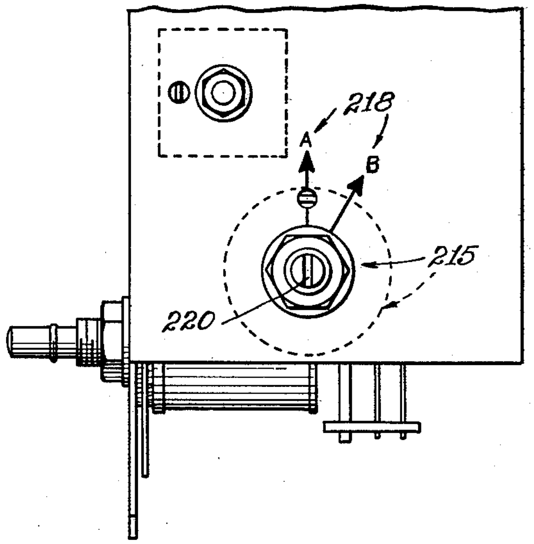
FIG. 2 is an elevational view of a portion of the main credit accumulator means, one of the instruments of the present invention, and taken on line 2—2 of FIG. 3.
Figure 1:
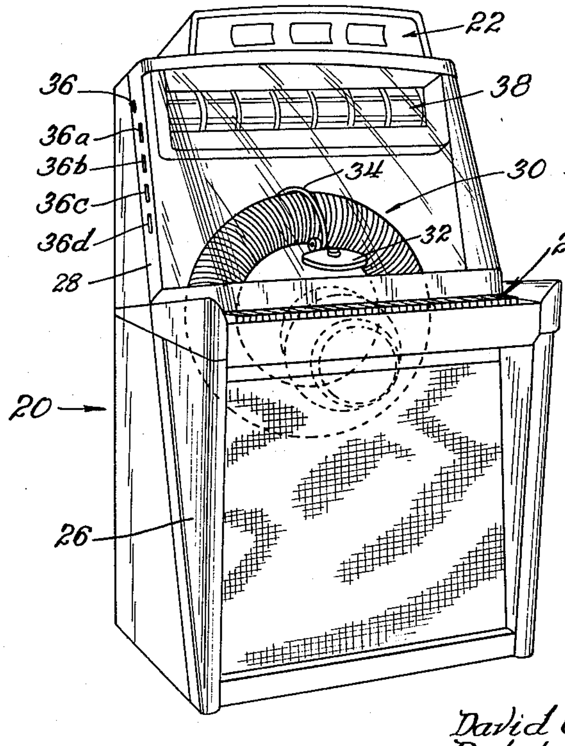
FIG. 1 is a perspective view of an automatic phonograph of a type to which the present invention is adapted.

Referring now in detail to the drawings, attention is directed first to FIG. 1 which shows a perspective overall view of an automatic phonograph of a type to which the present invention is adaptable, but it will be appreciated that the invention can be embodied in other types of phonographs as well. The phonograph illustrated in FIG. 1 includes a cabinet 20 enclosing most of the operating parts but having accessible to the patron certain control or selection buttons 22 and keys 24. The cabinet 20 may include front portions 26 and 28 which are adapted to be opened for accessibility to the operating parts by a service man, but which may be locked in closed position when the phonograph is in condition for playing. The main operating parts contained within the cabinet includes a record magazine 30, a turntable 32 and record transferring means and playing means indicated diagrammatically at 34. The magazine, turnable and record transferring and playing means may be of the general type disclosed in our United States Letters Patent No. 2,804,307 issued August 27, 1957, to which reference may be made for details of operation thereof. The phonograph is provided with a coin insert means indicated diagrammatically in FIG. 1 by a plurality of slots 36, which in the present instance are four in number and as will be brought out in detail hereinbelow, and adapted of receiving coins of the values of 5¢, 10¢, 25¢ and 50¢. Also included in the operating mechanism shown or indicated in FIG. 1 is a rotatable program holder indicated generally at 38, which may be of the kind disclosed and claimed in our co-pending application Serial No. 839,725 filed September 14, 1959. The relation of the program holder 38 with the present invention will be brought out in detail hereinbelow.

The operation in general of the operating parts hereinabove referred to is that records contained or held in the magazine 30, are removed from the magazine by the record transferring means 34 and placed on the turntable 30 whereupon the records are played and thereafter returned to the magazine. These operations take place after deposit of sufficient coins in the coin insert means 36 and appropriate manual selecting operations performed on the buttons 22 and keys 24.

Figures 10, 11, 12, 13, 14:
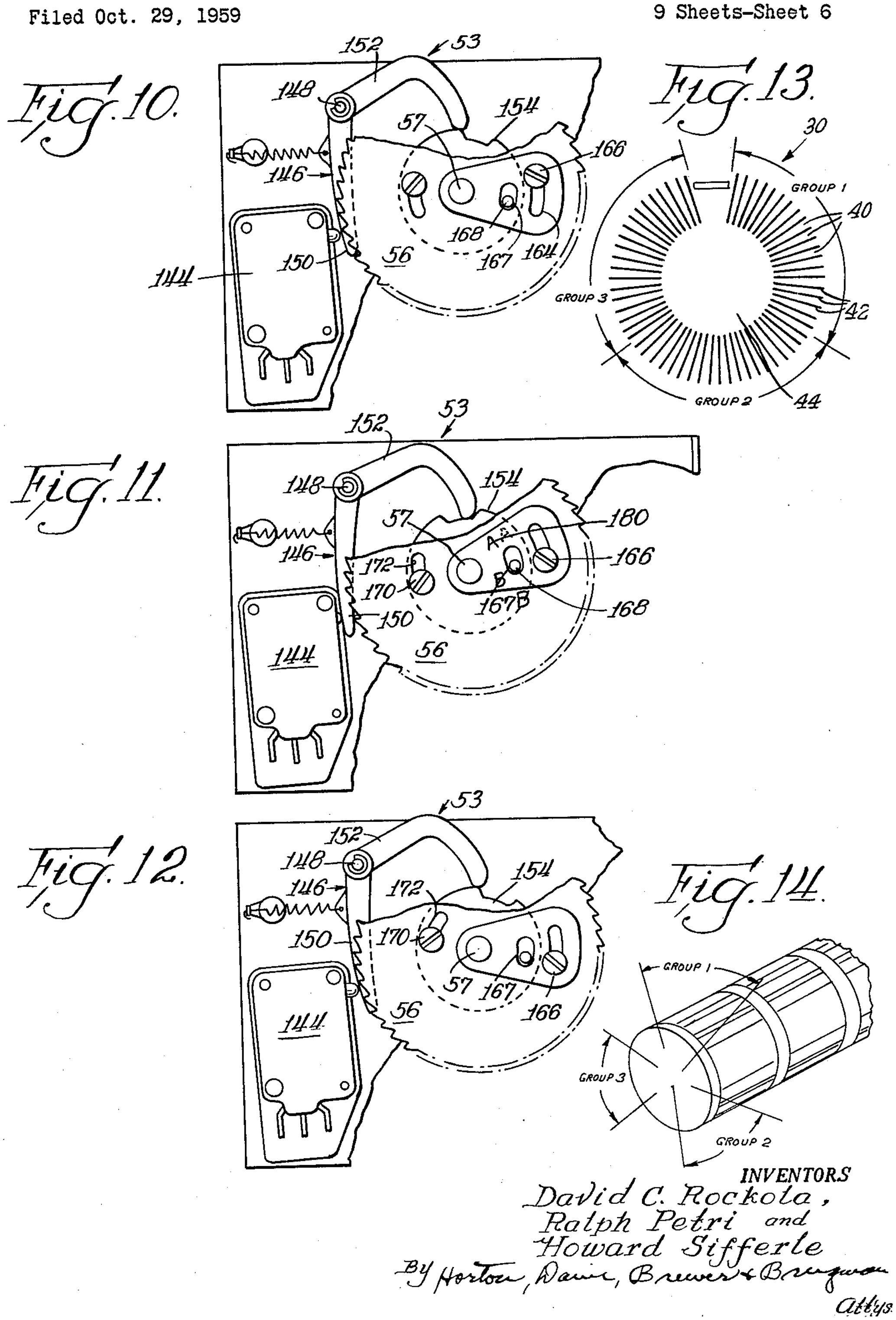
FIG. 10 is a view similar to FIG 9 but with certain members in different positions.
FIG. 11 is a view similar to FIG. 10, showing elements adjusted to different positions.
FIG. 12 is a view similar to FIG. 11 with certain members in different positions.
FIG. 13 is a diagrammatic view, in front elevation, of the record magazine of the phonograph.
FIG. 14 is a fragmentary perspective view of the program holder.

Although the details of the magazine 30 may be found in our prior patent mentioned, reference is made to FIG. 13 showing diagrammatically the arrangement of the magazine. The magazine is provided with a plurality of pockets 40 formed by radial wires or bails 42 secured to a hub means 44. In the present illustration, the capacity of the phonograph is 60 records, or 120 sides of recordings, as will be referred to again in connection with the circuit of FIG. 15 and the method of establishing and cancelling credit. However, the invention is not limited to a phonograph of the capacity mentioned, but is equally adaptable to phonographs of other capacities such for example as 100 records and 200 sides or recordings. For convenience in identifying records, they are classified in groups, as brought out more fully in our co-pending application Serial No. 839,725 referred to above. This classification or grouping of records is utilized in the functioning of the present invention since it is found convenient to control the playing operations according to these groups. In the present instance of 60-record or 120-side capacity, the records are arranged in three groups of 20 records or 40 sides each, as indicated by the legends "Group 1," "Group 2" and "Group 3" in FIG. 13. The group control buttons 22 determine which of the groups are made accessible for playing, and the individual selection keys 24 determine which of the recordings within the selected group are played. In the present instance, there are three control buttons 22, or one for each of the groups into which the records are classified, and there are forty individual control keys 24 in accordance with the number of sides or recordings on the records in each group. Upon manual actuation of one of the control buttons 22, the movable program holder 38 rotates to a corresponding position in which program tabs in the holder and identifying the records in that group are presented to view to the patron, if the program holder was not already in that position. In this same operation certain portions of the electrical circuitry are energized for enabling selection of the desired record and playing of it, by the movement of the group buttons 22 themselves, or movement of the program holder 38, or both, the consideration being that upon the manual operations having been performed for selecting the desired group, the operating mechanism for playing the desired record is energized or put into position in response to the performance of whatever operations are necessary, such as deposit of coins and actuation of the individual keys 24.

Reference is next made to the broad principles of the present invention, one of which is the provision for accommodating records of different value representations and and the establishment and cancellation of credit corresponding to those values. Records made for use with automatic phonographs include two classifications known as standard and extended play or "EP." A standard record is one having a playing time which may be for present purposes considered a minimum playing time, while an extended play record has a greater playing time. It is of course desired to make appropriate charges for playing these different kinds of records, such, for example as 10¢ for a standard record and 15¢ for an EP record, referred to herein as the 10¢-15¢ scale (another scale of charges for playing the records will be referred to hereinbelow). If it were desired to play only the standard or the EP record without the other, the instrumentalities for effecting this operation would be simple in view of the uniformity of operation. However, to provide for automatically and indiscriminately playing standard records and EP records requires exceedingly greater complexity in operating mechanism. That possibility of playing these two kinds of records is accomplished by establishing or setting up accumulated credit corresponding to the total value of the coins deposited, which may be a substantial amount, and cancelling that credit as the records are played, in amounts corresponding to the values represented by the respective records, which in turn correspond to whether the records are of standard or EP character.

Figures 3, 4:
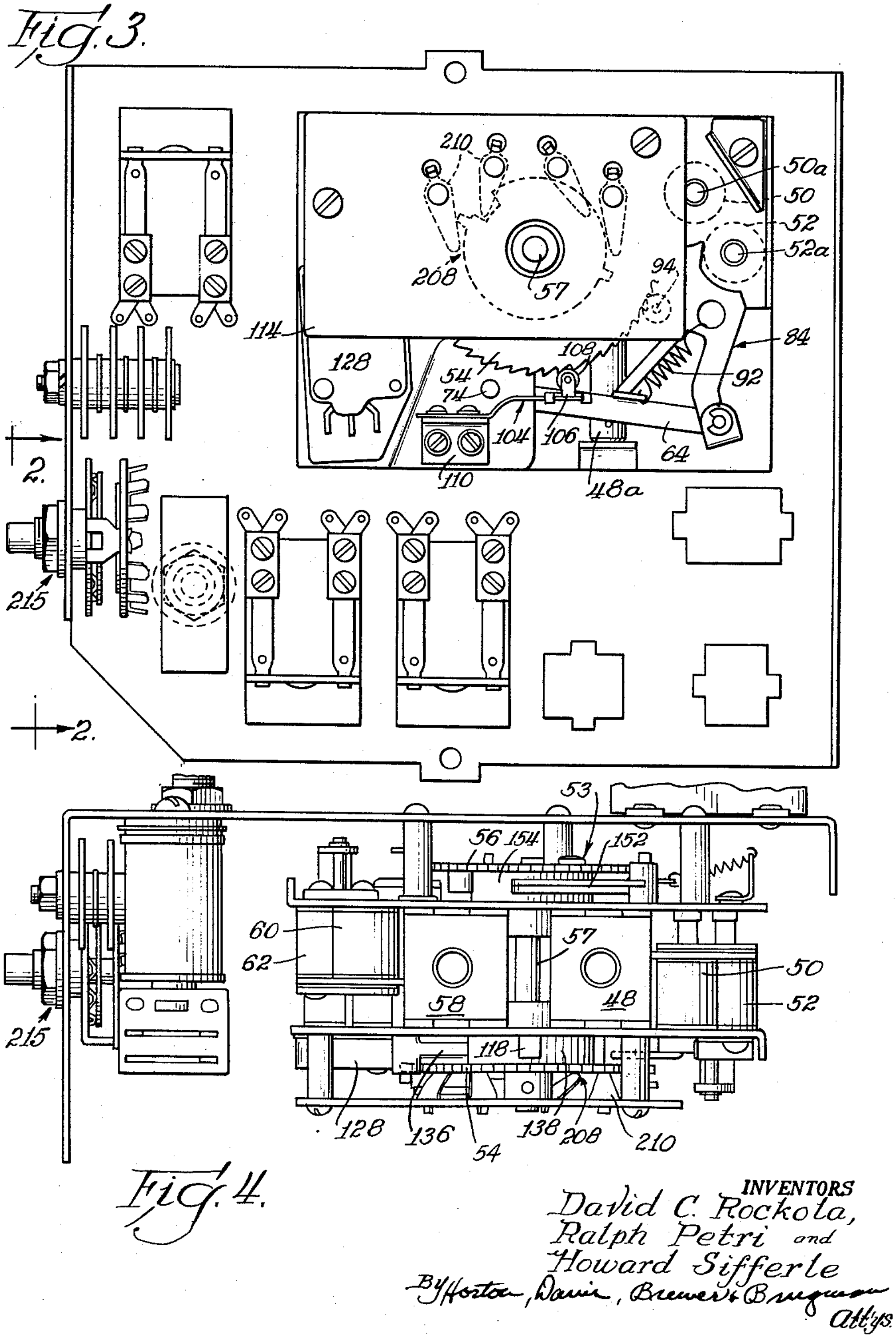
FIG. 3 is a front elevational view of the instrument of FIG. 2.
FIG. 4 is a top plan view of the instrument of FIG. 3.
Figure 5:
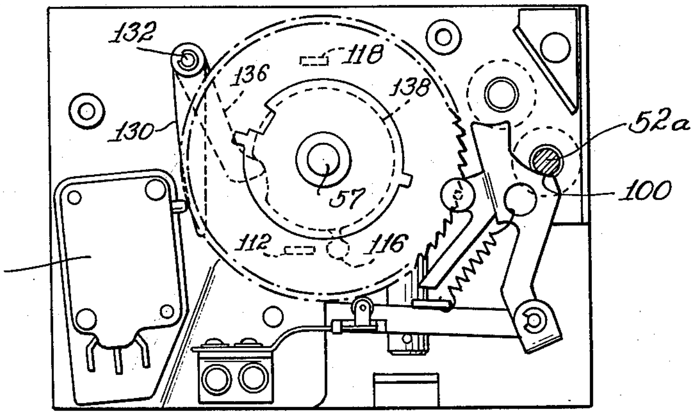
FIG. 5 is a view of a portion of the instrument of FIG. 3 oriented in the same direction but with certain of the elements removed and with certain of the operating members in different positions.
Figure 6:
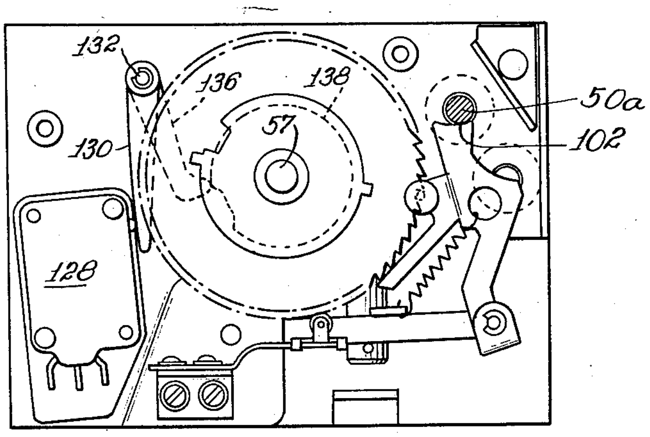
FIG. 6 is a view similar to FIG. 5 but with certain operating members in different positions.

The means for setting up or accumulating credit includes the credit accumulator instrument shown in FIGS. 3 to 11 inclusive and designated generally at 35, and certain elements indicated diagrammatically in FIG. 15. The coin insert means referred to above and described hereinbelow includes the slots 36 in FIG. 1 which may be placed in any desired location in the phonograph, but which in the present instance may be designated **36*a*, a 50¢ slot, 36*b*, a 25¢ slot, 36*c*, a 10¢ slot, and 36*d*, a 5¢ slot. Upon deposit of the respective coins in these slots, switches are actuated for controlling certain circuit portions, these switches being shown diagrammatically at 46*a* in FIG. 16, and 46*b*, 46*c* and 46*d* in FIG 15. The switch 46*a* of FIG. 16 is embodied in the auxiliary credit accumulator of FIGS. 18, 19 and 20, while the switches 46*b*, 46*c* and 46*d* may be placed in any desired location. Associated with the switches 46*b*, 46*c* and 46*d* are solenoids 48, 50 and 52 (FIG. 15) embodied in the credit accumulator 35 of FIGS. 3 to 11, and utilized in actuating the mechanical mechanism for accumulating the credit established by the deposit of the coins. The solenoid 48, termed the drive solenoid, is shown in FIG. 4 while the solenoids 50 and 52, referred to as blocking solenoids, are shown in FIG. 4, but more particularly in FIGS. 2, 5, 6 and 7. The solenoids 48, 50 and 52 are provided with armatures or plungers 48*a*, 50*a* and 52*a*, respectively, adapted to perform driving or blocking functions as referred to again hereinbelow. The credit accumulator 35 includes ratchet means indicated generally at 53, which is advanced to accumulate credit provided by deposit of coins and retracted to cancel that credit pursuant to playing of the records. The ratchet means is made up of two separate and spaced ratchet wheels 54 and 56 which are mounted on a common shaft 57 for conjoint rotation in each of opposite directions. Two separate ratchet wheels are provided so as to provide teeth oriented in opposite directions for accommodating the advancing and retracting pawls, respectively. These wheels are best shown in FIG. 4 and for the purpose of simplifying construction, the instrument is made in good part symmetrical so that solenoids 58, 60 and 62 may be arranged for functions similar to or identical with the functions of the solenoids 48, 50 and 52, but in opposite senses, the solenoids 48, 50 and 52 effecting drive and control of the ratchet means in advancing direction, while the solenoids 58, 60 and 62 effect drive and control of the ratchet means in retracting direction. The solenoids 58, 60 and 62** are indicated in FIG. 15 and the specific operation of these solenoids will be brought out in connection with the cancellation of the credit.

The ratchet means is advanced by the drive solenoid 48 acting on the wheel 54. The linkage and associated elements driving the ratchet wheel are shown in exploded view, indicated generally at 63, in FIG. 8, and in elevational view in FIGS. 3, 5, 6 and 7. As shown in FIG.

8, the armature or plunger 48*a* of the solenoid 48 has a lower forked end 48*b* arranged for connection with a lower arm indicated in its entirety at 64. This arm 64 has a yoke portion 66 with arm elements 68 and 70 having aligned apertures 72 for receiving a pin 74 (FIG. 7) for pivotally mounting the arm. The arm element 68 has an offset portion 76 at its swinging end which is received betwen the elements of the forked portion 48*b* of the plunger 48*a*, a pin 48*c* being inserted in the apertures below the offset portion 76. A coil spring 78 is mounted on the pin 74 in a conventional manner and arranged to react between the arm 64 and a fixed member 79 of the instrument on which it is mounted for biasing the arm 64 to a retracted position which in the illustrations of the drawings is in lowered position.

The other arm element 70 has a turned over lug 80 acting as a stop means as referred to below, and a pin 82 at its outer end for pivotally mounting a pawl indicated in its entirety at 84. This pawl 84 has a yoke portion 86 at its lower end having aligned apertures 88 receiving the pin 82. The pawl 84 has a finger 90 positioned for engaging the lug 80 (see also FIG. 3) and limiting the pivotal movement of the pawl in corresponding direction (counterclockwise) relative to the arm 64, the pawl being biased in that direction to its limit position by a tension spring 92 connected between the lug 80 and the pawl. The pawl 84 is provided with a pin 94 mounted on and extending laterally from an extension 96, and having a head 98 on its outer end. This pin 94 is adapted to engage the teeth of the corresponding ratchet wheel (54, see FIG. 4) upon energization of the solenoid 48 and actuation of the linkage. The pawl 84 is of irregular shape having abutment shoulders 100 and 102 for engaging the plungers 52*a* and 50*a*, respectively, upon actuation of the solenoid in the operation of accumulating or setting up credit.

The ratchet means 53 including the wheels 54 and 56 is normally and releasably retained in any set position by a detent 104 which may include a spring arm 106 having a roller 108 engageable with the teeth of one of the wheels (e.g. 54). This spring arm 104 is mounted on a fixed element such as 110 of the instrument and is biased upwardly with the roller in engagement with the teeth, yielding upon rotation of the ratchet means by the advancing and retracting mechanisms.

The ratchet wheels advance and retract relative to a home position which is defined by convenient limiting means such as stud 112 mounted on a fixed element of the instrument such as a frame element 79 and a pin 116 mounted on one of the ratchet wheels (e.g. 54). This limiting means defines the limit of rotation of the ratchet means in clockwise direction (FIG. 3) which in the arrangement of the instrument is at the end of retracting movement in that direction. The ratchet means rotates in counterclockwise direction in advancing movement and is limited at the end of this movement by a similar stud 118 mounted on the frame element 79 and engageable by pin 116. The extent of this movement in advancing direction may be as desired within wide limits, as referred to again hereinbelow.

The following description will assume advancing operations from the home position of the ratchet means. Upon energization of the solenoid 48 (FIG. 2), the plunger 48*a* (FIG. 3) is retracted or raised which swings the arm 64 upwardly. The pawl 84 in retracted position of the linkage as shown in FIG. 3 is disposed to the left with the pin 94 of the pawl in engagement with one of the teeth of the ratchet wheel 54. The finger 90 may also be in engagement with the lug 80 in this position. Upward movement of the arm 64 results in corresponding movement of the pawl 84 and rotation of the ratchet means in counterclockwise direction, this movement being limited by stop means at corresponding positions which include the plungers 52*a* and 50*a* referred to above and a final stop means 120 (FIG. 7) which may be in fixed position. Upon projection of the plunger 52*a* the shoulder 100 engages this plunger (FIG. 5) in response to raising movement of the linkage. This stop constituted by the plunger 52*a* is located at a predetermined position to effect movement of the ratchet wheel the desired amount which in the present instance is one increment or one tooth. Upon projection of the plunger 50*a*, instead of plunger 52*a*, only one of which may be projected at a time, the shoulder 102 engages that plunger 50*a* in response to upward movement of the linkage, and as will be observed in FIG. 6 the movement as limited by this plunger is greater than when limited by the plunger 52*a*. In the present instance also the plunger 50*a* is positioned at the desired location to limit the movement of the ratchet wheel the desired amount which in the present assumed example is two increments or two teeth.

The maximum movement of the linkage is determined by the stop means 120 (FIG. 7) which in the present instance is positioned for allowing the ratchet wheel to be moved or advanced six increments, or six teeth.

These different amounts of movement of the ratchet means correspond to the different coins deposited in the coin insert means and specifically correspond to the 5¢, 10¢ and 25¢ coins. In this arrangement of elements, the basic or minimum increment of movement of the ratchet means is one tooth and this corresponds to the value of the 5¢ coin. Reference may be had to the circuit of FIG. 15 in the present description of the credit accumulator. Upon deposit of, for example, a 5¢ coin in the coin insert means, and other conditions existing for normal playing of the phonograph, the switch 46*d* is closed. Circuit is then completed through the blocking solenoid 52 and the driving solenoid 48. The solenoid 48, upon being thus energized, actuates the linkage including the pawl 84 as above described and simultaneously with the energization of that solenoid, the plunger 52*a* of the solenoid 52 is projected to a position for engagement by the shoulder 100. The time interval of movement of the pawl 84 enables timely projection of the plunger 52*a*. This operation advances the ratchet means one increment or one tooth.

If instead of a 5¢ coin, a 10¢ coin is deposited, and other conditions being normal, the solenoids 50 and 48 are energized with a resulting operation similar to that described in connection with the 5¢ coin, except that the plunger 52*a* remains retracted and the plunger 50*a* is projected instead. In this operation the shoulder 102 engages the plunger 50*a* and the resulting movement of the pawl 84 is sufficient to advance the ratchet means two increments or two teeth.

The third condition is when a 25¢ coin is deposited. The switch 46*b* is closed and only the solenoid 48 is energized, the plungers 52*a* and 50*a* remaining retracted, and the movement of the pawl 84 is limited only by the fixed stop 120 (FIG. 7) and the ratchet means is advanced six increments or six teeth. In this operation a bonus credit is provided for by the deposit of a 25¢ coin, relative to 5¢ and 10¢ coins, while if only 5¢ and 10¢ coins are utilized, the credit accumulated is in direct proportion to the value of the total coins deposited.

The advancement of the ratchet means in the manner described represents corresponding credit which is cancelled pursuant to playing of the records, as explained fully hereinbelow. The amount of credit that can be accommodated may be as desired up to a relatively large amount, as determined by the total movement or rotation of the ratchet means permitted, by location of the stop pins 112 and 118. The teeth on the ratchet wheel 54 are arranged in such direction that the pin 94 on the pawl 84 easily rides over the teeth in retracted direction, the pawl yielding against the influence of the spring 92 in this operation, while the pin is held to the teeth in advancing direction. The teeth on the opposite or companion ratchet wheel 56 are arranged in opposite direction, but in such direction relative to the cancelling means as to effect the same operation on the ratchet wheel 56.

Figure 7:
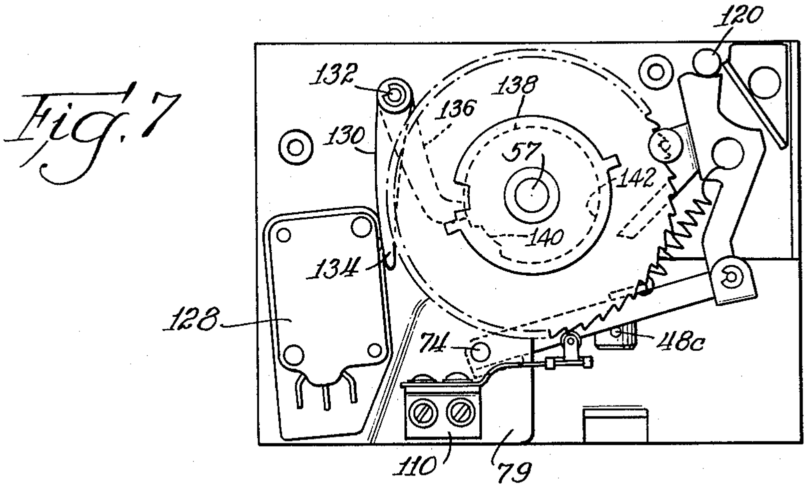
FIG. 7 is a view similar to FIG. 6 but with certain of the operating members in still different positions.
Figure 8:
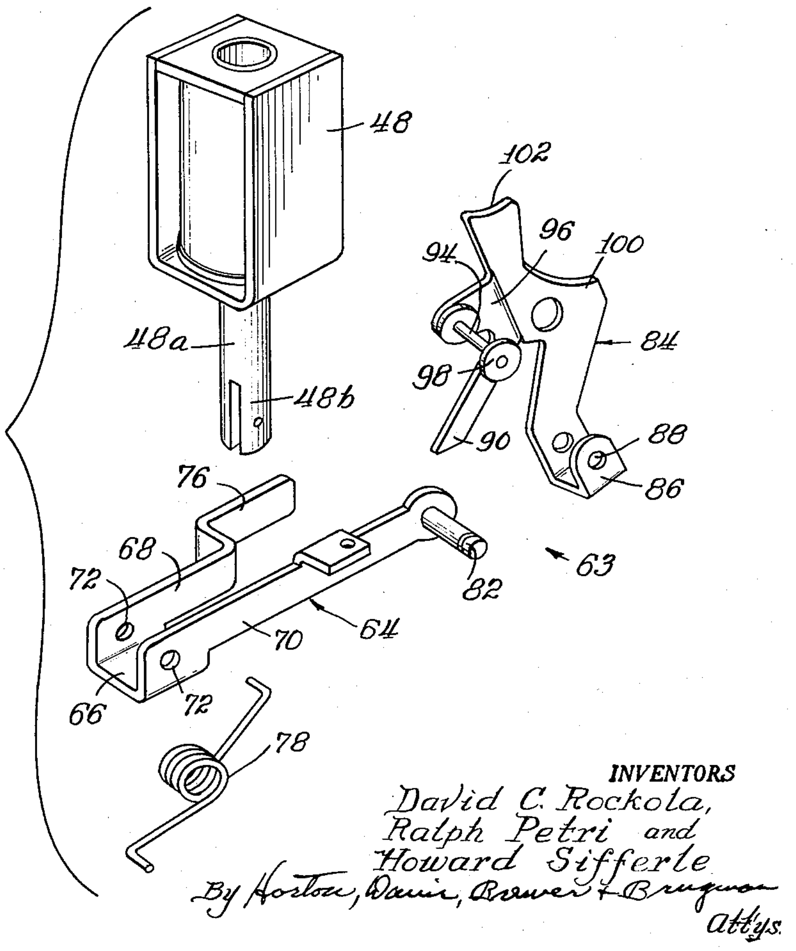
FIG. 8 is an exploded view of certain of the elements of the instruments of FIGS. 5, 6 and 7.
Figure 9:
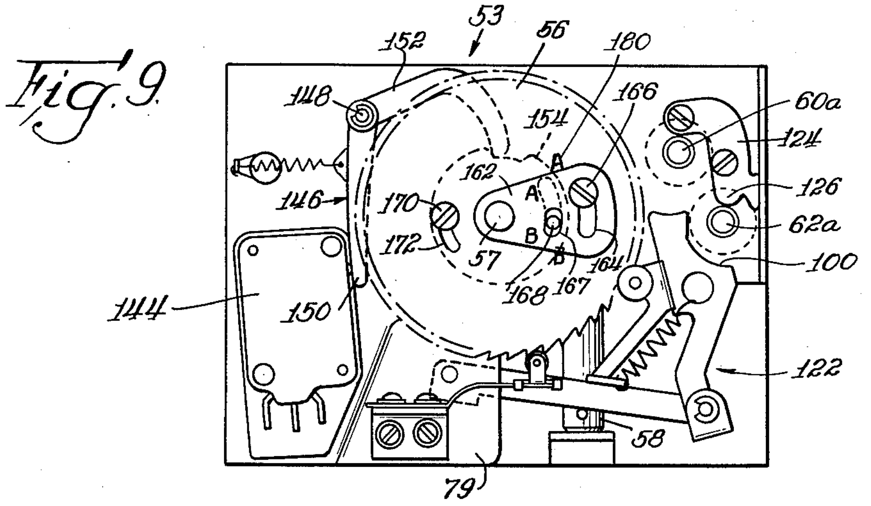
FIG. 9 is a view of a portion of the instrument of FIG. 3, but taken from the side opposite that of FIG. 3.

Reference is now made to FIG. 9 (as well as FIGS. 10, 11 and 12) showing the ratchet means from the side opposite that shown in FIGS. 3, 5, 6 and 7, the wheel 56 being thus presented to view. In this instance the solenoid 58 referred to above operates linkage 122 in a manner precisely that described above in connection with solenoid 48 and accompanying linkage 63 (FIG. 8). In the present instance the plungers **62*a* and 60*a* of the solenoids 62 and 60, respectively, limit the movement of the linkage 122 to one increment and two increments, respectively. A third stop means 124 is provided in this case which may be a clip of convenient size and shape, fixedly mounted on an element of the frame of the credit accumulator instrument and having a terminal portion 126 forming a lug engageable by the shoulder 100 for limiting movement of the linkage the maximum amount which in the present instance is three increments. The solenoids 58, 60 and 62**, as mentioned above are shown in the circuit of FIG. 15 and are energized in response to playing operations of the records, as described below. In connection with cancelling the credit accumulated in the credit accumulator means, the maximum credit cancelled is that corresponding to the highest value represented by any of the records, which in the example assumed above is 15¢, or three increments or teeth. Provision is made for cancelling credits of 10¢ to correspond with the lesser value records, and to cancel credit of 5¢ in the lower charge scale operation as will be explained fully hereinbelow.

In order to render effective the credit set up or established in the credit accumulator, the movable member or ratchet means 53 is utilized to actuate certain switches and energize corresponding circuit portions for enabling operations corresponding to credit of 5¢, 10¢ and 15¢ coins, respectively. One of such switches is shown in FIG. 7 at 128, which is actuated by a member 130 which may be in the form of a bell crank lever pivotally mounted on a pin 132 and having one arm 134 positioned for engaging an actuating plunger of the switch, and another arm 136 acting as a follower for a cam member 138 fixedly mounted on the ratchet means or the shaft 57 for rotation therewith. This cam member has cam elements including a low point 140 and a high point 142 which when engaged by the swinging end of the arm 136 control the bell crank lever for actuating the switch 128. Other cam elements, such as 143, may also be provided for other control operations. This cam member 138, being fixed, actuates the switch at the same point of rotation of the ratchet means at all times and in the specific arrangement illustrated, this actuation occurs upon movement of the ratchet means two increments or two teeth from home position. When the ratchet means is in home position, for example, the yarn 136 is in the low point 140 and the switch is in one condition, e.g. open; when the ratchet means is advanced only one increment or tooth, no operation of the switch takes place, but when the ratchet means is advanced two increments or teeth, the switch is actuated to its opposite condition, e.g. closed, as indicated.

Another switch means directly associated with the present switch means 128 in its control of the operation of the phonograph as related to the amount of credit accumulated, is controlled by the ratchet means 53 and illustrated in FIGS. 9–12. Such switch means is indicated at 144 and is controlled by an actuating member 146 in the form of a bell crank lever pivotally mounted on a pin 148 and having one arm 150 positioned for actuating the plunger of the switch, and another arm 152 arranged for following a cam member 154 which is mounted on the shaft 57, but in this case the cam member 138 is mounted for limited adjustment on that shaft relative to the associated ratchet wheel which in the present instance is the wheel 56. The present cam member 154 is shown isolated in FIG. 17 where it will be seen it has a central aperture 156 for receiving the shaft 57, a tapped hole 158, and a lateral pin 160, both the latter disposed eccentrically to the axis of the cam member or aperture 156. A clip 162 in the form of an arm is fitted flat to the associated ratchet wheel 56 on the side thereof opposite the cam member, with one end pivotally mounted on the shaft 57 and its other end extending radially to a convenient point beyond the radius of the cam member where it has an arcuate slot 164 concentric with the axis of the shaft and receiving a headed pin 166 fixed to the ratchet wheel 56. The pin 160 on the cam member is received in an arcuate slot 167 in the ratchet wheel concentric with the axis of the shaft 57, and an aperture 168 in the arm wheel. A screw 170 is inserted through an arcuate slot 172 in the ratchet wheel concentric with the axis of the shaft 57, and threaded into the tapped hole 158 in the cam member. The screw 170 acts as a lock screw and upon loosening this screw, the arm 162 may be swung with consequent angular adjusting movement of the cam member relative to the ratchet wheel 56. Upon moving the cam member to the desired position, the lock screw 170 may be tightened to lock the cam member in that adjusted position. The arm 162 acts through the pin 160 on the cam member for adjustably moving the cam member.

The cam member 154 has a low point 176 of small circumferential extent, and a high point 178 of substantial circumferential extent. When the arm 152 is in the low point 176 of the cam member, the switch 144 is in one condition, e.g. open, and when it engages the high point 178 the switch is in the opposite condition, or closed position. The cam member 154 is positioned on the ratchet wheel so that the arm or follower 152 engages the low point 176 when the ratchet means is at home position, and it rides up onto the high point at a point of advancement depending upon the adjustment thereof through the arm 162. In the arrangement of members in the present description, this cam member may be adjusted to either of two positions, in one of which the arm 152 rides onto the high point at one increment or tooth movement, and in the other of which it rides up when the ratchet means is advanced three increments or teeth. Appropriate markings may be provided such as "A" and "B" as indicated at 180 to indicate the respective settings, A for example representing standard play position and B, EP position. The present switch 144 cooperates directly with the switch means 128 (FIG. 7) for controlling the respective play of standard and EP records. In the case assumed above, or 10¢-15¢ scale of charges, wherein a standard record may be played with 10¢ credit, and an EP record played with 15¢ vredit, the mechanism for the switch 144 (FIG. 9) is set so that the switch 144 is actuated at the three-increment position of the ratchet means, next following the actuation of switch 128 (FIG. 7) which, being fixed at the position stated, is actuated at the two-increment position of the ratchet means.

The series of figures, 9–12, show by comparison the different adjustments of the arm 162 and thus the cam member and different positions of the ratchet member for each adjustment; FIG. 9 shows the ratchet member is in home position and the cam in the one-tooth position, with the cam follower in the low point of the cam; in FIG. 10 with the adjustment remaining as in FIG. 9 the ratchet wheel is advanced one tooth and the follower is on the high point; in FIG. 11, the adjustment is the three-tooth adjustment, the ratchet is in home position, and the follower is in the low point; while in FIG. 12, the adjustment is as in FIG. 11, and the ratchet is advanced three teeth and the follower is on the high point.

In the 10¢-15¢ scale of operation in the example assumed, in response to a step in the record transferring and playing operation, one or more of the cancelling or subtracting solenoids 60, 62, 58 are actuated and they cancel the corresponding amount of credit from the credit accumulator means. In the position of circuit as shown in FIG. 15, the switches 182 and 184 represent three and two credit increments, respectively. When the EP relay switch 186 is closed and the circuit otherwise in normal operating condition and with the switch 182 in the position shown, the solenoid 58 is energized and three increments of credit are cancelled or subtracted from the credit means. Similarly, with the switch 184 in the position shown and the standard relay switch 188 closed, the solenoids 58 and 60 both are energized with the result that two increments of credit are cancelled. The position of the switches 182 and 184 represent the condition referred to above, namely, the 10¢-15¢ scale, in which a standard record can be played for 10¢ credit and an EP record for 15¢ credit. The switches 186 and 188 are closed upon energization of relay coils 216 and 224, respectively, described hereinbelow.

Attention is directed to FIG. 14 showing diagrammatically the areas of the different groups in the program holder. Each group area of the program holder represents one or the other of standard or EP records, according to desired selection. The program holder has a tab identifying both sides of each record in the record magazine 30 (FIG. 13) which are divided into groups corresponding to those of the program holder. Provision is made, as described in detail below, for preselecting the credit cancellation for records in each group, and accordingly the standard or EP records are placed in the various "group" positions of the magazine. In FIG. 15*a* is shown the exterior of a switch bank having switch buttons 194, one for each of the groups of the program holder and magazine. These switch buttons may be shifted in one or the other direction to shift the corresponding switch 200 (FIG. 15) of which there is one for each group, into the position shown, or the opposite position. The operator of the machine therefore has the option of placing either standard or EP records in any of the groups. More specifically, assume that an operator wishes to place EP records in Group 1 and standard records in each of the other two groups. He will then manipulate the button 194 corresponding to Group 1 to EP position and the other two to standard position. These switch buttons will then place the switch 200 for Group 1 in circuit as shown in FIG. 15, and place those for Groups 2 and 3 in the opposite directions.

The circuit of FIG. 15 shows one of the individual selection keys 24 and switch 196 actuated thereby, which control operations are fully described in the prior patent referred to above. During the course of a playing operation, a program cut-out switch 198 is opened, also as described in the prior patent mentioned, which terminates certain record playing operations and opens the present circuit.

As noted above, the ratchet means 53 in the credit accumulator is utilized for operating a plurality of switches for various purposes, and certain of the operations effected thereby have to do with controlling visual indications of credit which may be done by lighting signal lights. Such signal lights are indicated at 202, 204 and 206 in FIG. 15 (lower righthand corner). These signal lights are controlled by switch means indicated generally at 208 in FIG. 3 and shown diagrammatically in FIG. 15. These switch means include wiper arms 210 in contact with rings on the adjacent ratchet wheel 54. Upon the ratchet wheel reaching certain points of advancement in its movement, the corresponding switch means are closed for lighting the signal lights 202, 204 and 206. Specifically, when the ratchet wheel is advanced one increment or tooth, the signal light 202 representing 5¢ credit is lighted; when it is advanced two increments or teeth, the respective switch means is closed for lighting the signal light 204, representing 10¢ credit. When the ratchet means reaches the position of three increments, or three-tooth advancement, the switch is closed for lighting the signal light 206 which may be marked to indicate to the patron to make a selection. This signal light corresponds to at least 15¢ in credit accumulated and is sufficient to play any record that is in the phonograph, that being the most expensive record in the example assumed above. It will be understood that the signal lights 202, 204 and 206 may be marked with any appropriate indications as to the operations that may be performed, those referred to above being appropriate for accommodating records of the two classes mentioned, and in the charge scale assumed, i.e., standard records can be played for 10¢ credit, and EP records for 15¢ credit. When the signal light 206 is lighted, there may be more than 15¢ credit accumulated.

While the principal example had to do with the 10¢-15¢ scale, it is desired to provide for a different charge scale, such for example as a 5¢-10¢ scale, i.e., a standard record can be played for 5¢ credit and an EP record for 10¢ credit. The switches 128 and 144 described above in connection with FIGS. 7 and 9 are shown in the circuit of FIG. 15 (left center). It will be recalled that these two switches are normally open, but they close in response to the movement of the latch means 53 in advancing direction at certain points of advancement thereof. The switch 128 is closed at all events upon advancement of two increments or teeth, and the switch 144 is closed at one or three increments or teeth, depending upon the setting of the adjustment means shown in FIG. 9. In order to simplify and facilitate changeover from the 10¢-15¢ scale to the 5¢-10¢ scale, and without requiring adjustment of both of the switches, additional reversing switch means is provided to accompany this changeover between the two scales. Such switch means includes individual switches 212 and 214 which are ganged together (and ganged with switches 182 and 184), these gang switches being located in a switch structure at a suitable location such as indicated at 215 in FIGS. 2, 3 and 4 which is adjustable between opposite positions indicated by the letters A and B at 218 (FIG. 2) to correspond, with the similar adjustments and markings 180 in FIG. 9. Position A may correspond, for example, to the 10¢-15¢ scale. This switch means may be manipulated as by a screwdriver, having a slot 220 (FIG. 2) for that purpose.

The switches 212 and 214 as will be appreciated from a study of the circuitry of FIG. 15 place the switches 128 and 144 in the proper sequence for EP and standard records according to whether the switch 144 is in the three-increment position or the one-increment position. By way of example of the operation of this portion of the circuit, assume that the switch 144 is in the three-increment position which is indicated by the letter A in FIG. 9. In this setting of the switch the ganged switches 212 and 214 must also be in the A position, which is accomplished by a manual manipulation, as described. The credit accumulator is thus set for the 10¢-15¢ scale. In this setting, and when, for example, a 5¢ coin is deposited, the latch means is advanced one tooth; one unit of credit is set up, and through the switch means 208 thereon the 5¢ signal light 202 is lighted. Neither of the switches 128, 144 is closed and no record can be played. Then if a 10¢ coin is deposited, the latch means 53 is advanced two more increments or teeth to the three-increment position. In this condition, both the switches 128 and 144 are closed, and with the switches 212 and 214 in the positions indicated at FIG. 15, circuits are closed down to the switch 200. Assuming next that the group of records exposed to view and positioned for determining selection of the records in that group are EP records, and the switch button 194 for that group is accordingly positioned in the EP position, the switch 200 for that group is as positioned in FIG. 15, namely in that EP position. This completes a circuit through the switch 200 and energizes relay coil 216. Energization of this relay coil closes holding switch 218 as well as switch 186 and switch 221 for lighting the signal light 206.

Upon completion of the foregoing steps, one of the individual selection keys 24, represented by the single one illustrated in FIG. 15, may be manually actuated by the patron. This manipulation by this key puts into operation the record transferring and playing means described in full in the prior patent mentioned above. Actuation of this key 24 also moves switch 222 to the position shown in FIG. 15, which completes a circuit through switch 182 and energizes solenoid 58, the switch 182 being in the 10¢-15¢ scale position. The solenoid 58 upon energization moves the latch means 53 in retracting direction three increments or teeth, and thereby cancels credit corresponding to 15¢.

Assuming as another example that only 10¢ is deposited in the coin insert means, either in the form of two 5¢ coins or a single 10¢ coin. In either case, the latch means 53 is advanced two increments or teeth and the switch 128 is closed while the switch 144 remains open. In this position of the latch means, the switch means controlling the circuit to the signal light 204 is completed. Also in this condition, the switch 214 is in position to complete the circuit through switches 128 and 214 down to the switch 200 and the circuit will be completed or not, depending upon the position of the corresponding switch 200, as to whether EP records or standards records are contained in the group that are presented to the patron. If EP records are in this group, the switch 200 for that group will be in the position shown in FIG. 15 and no circuit is completed, while if standard records are in this group, the switch 200 will be in the opposite position and a circuit will be completed through the standard relay coil 224. Energization of this coil closes switch 226 as well as switch 188, and switch 228 leading to the signal light 206. In this condition of the circuit, the desired key 24 of the group selected may be actuated and in response thereto the switch 222 is moved to the position shown in FIG. 15. As before, circuit is completed through switches 188 and 184 to energize the solenoids 60 and 58. Energization of these two solenoids results in cancellation of 10¢ credit in the credit accumulator, as explained above. In either case, upon actuation of the key 24, the switch 222 opens the circuit through the corresponding relay coil 216 or 224.

When it is desired to set the phonograph to the 5¢-10¢ scale, the switch means 144 is set to the one-increment position or that indicated at B in FIG. 9. A similar adjustment is made in the switch means 215 (FIG. 2) to set it to the B position. This adjustment moves all of the ganged switches 212, 214, 182, 184 (FIG. 15) to their alternate positions, opposite that shown in that figure. In this condition of the circuitry and by way of example in explanation of the function of the circuitry, assume that a 5¢ coin is deposited in the coin insert means. The ratchet means 53 is advanced one increment or tooth and the switch 144 (FIGS. 9 and 15) is closed. With this switch closed, circuit is completed through this switch, and reversing conductor 230 (FIG. 15) to switch 214 in its alternate position and then through the relay coil 224 down to the switch 200. If the switch 200 is in its standard position, or opposite that shown in FIG. 15 and circuit is completed through the coil 224 and upon energization of this coil, the switches 226, 188 and 228 are closed. Thus, upon deposit of a 5¢ coin, a standard record, representing a 5¢ value can be played, and upon actuation of the corresponding key 24, playing of the record is completed and cancellation of corresponding credit is accomplished, in the manner described above.

In this same setting of the circuit, namely, the 5¢-10¢ scale setting, assume next that 10¢ is deposited either in the form of two 5¢ coins or one 10¢ coin. In either case, the ratchet means 53 is advanced two increments or teeth and the switch 128 is closed, regardless of the setting of any other portions of the circuit, but because of the reversed position of the switch 212, which now is in the position opposite that shown in FIG. 15, the switch 128 represents the EP records—with the switch 128 closed, circuit is connected through that switch, reversing conductor 232 and switch 212 in its reversed position. Circuit is then completed through the relay coil 216 by virtue of the switch 200 for the group concerned being in the EP position or that illustrated in FIG. 15. Playing of the EP record selected may then be accomplished in the manner described above, and a credit of corresponding value, or 10¢, is cancelled from the credit accumulator. This cancellation, which takes place in response to actuation of the selector key 24, is accomplished through the circuit containing the switch 188 and the switch 184 which is then in its position opposite that shown in FIG. 15, whereupon the solenoids 62 and 58 are energized, effecting movement of the ratchet means two increments or teeth in retracting direction, as explained above, and removing 10¢ credit therefrom. The controls are such that a record representing a value less than that accumulated in the credit accumulator can always be played as, for example, when more than 15¢ is accumulated, either the EP or standard records in the 10¢-15¢ scale, can be played and similarly, if only 15¢ credit is accumulated, a standard record representing a 10¢ value can be played; since whenever either switch 128 or 144 representing the higher value is closed, the other representing a lesser value is always closed also, conditioning the circuitry for completion of the circuit through the corresponding relay coil 216 or 224, depending upon which setting the switch 200 for the related group is disposed in. For example, assume in the 10¢-15¢ scale setting, the switch 144 which then represents 15¢ credit is closed, the switch 128 which represents 10¢ credit is also closed because the ratchet means 53 having moved three increments or teeth to close the switch 144 will also have closed the switch 126 on movement of only two increments. In similar manner when the controls are set for the 5¢-10¢ scale, when the switch 128 again representing an advance of two increments or teeth, the other switch 144 which at that time will be set in the one-increment position will, of course, have been closed by movement of the ratchet means two increments.

Attention is next directed to FIGS. 18–20 and the circuit of FIG. 16 showing an auxiliary credit accumulator means adapted to inclusion in an automatic phonograph, in addition to built-in credit accumulator means originally incorporated in the phonograph. The credit accumulator 233 of FIGS. 18–20 is for the purpose of accommodating coins of relatively great value, such as 50¢ coins and constitutes a means for setting up or accumulating credit in the original built-in credit accumulator which may be designed for lower value coins—5¢, 10¢ and 25¢ coins. Many automatic phonographs are provided with coin insert means adapted to receive only lower value coins such as 5¢, 10¢ and 25¢ coins, but it may be desired in the case of those phonographs to provide for bonus credit upon deposit of the larger coins such as 50¢ coins. The credit accumulator 233 is adapted for application to the regular lower value credit accumulator and operates to advance that credit accumulator a plurality of times in response to insertion of a coin, to set up the desired credit.

Referring to the physical structure of the instrument 233, this instrument includes a suitable frame member 234 in which is mounted a pair of cams 236 and 238 mounted for conjoint rotation on a common shaft 240 suitably mounted in the frame. The shaft is driven by an electric motor 242 through a speed reduction gearing 244. These cams 236 and 238 are preferably in the form of disks, each having a plurality of camming elements which include two different kinds, namely, notches or low points 246 with corresponding high points 248, in the peripheral edges of the cams and projections 250 on the side surfaces thereof. These camming elements operate to actuate electric switches 252, 254 and 256 (FIG. 20) which structurally include a number of individual switches, certain ones of which are included in the circuit diagram of FIG. 16. These various switches are actuated at the respective points of the rotation of the cams for controlling corresponding operations of the main electrical circuit and operating mechanisms of the phonograph. The notches or low points 246 are of relatively short dimension circumferentially, and the follower elements of the switch means 252 remain therein for correspondingly short intervals in the cycle of rotation of the cams, and during the remaining and relatively larger portion of the cycle of rotation, the followers ride on the high points 248. As an example of the function of the switch means 242, the switch elements 258 may be opened (FIG. 20) for a control operation such as disabling the selecting mechanism of the phonograph while the present instrument is in operation. The follower elements of the switch means 254 and 256 are arranged for engagement by the projections 250 with corresponding momentary actuation of the related switches.

Coin insert means is provided for controlling the present instrument and is represented by the coin insert slot 36*a* in FIG. 1 as well as the switch 46*a* of FIG. 16, referred to above. In response to the deposit of a 50¢ coin in the slot, the switch 46*a* is actuated which energizes the motor 242 which in turn rotates the disk cams 236 and 238 a predetermined amount such, for example, as 180°, and at the end of such movement, it is brought to a stop through suitable controls such as by means of one of the switch followers dropping into a notch or low point 246. Also during this movement of the disk cams, various other ones of the switches 252, 254 and 256 are actuated according to the location of the cam elements 246, 248 and 250.

A manually operated switch control knob 262 is provided for actuation by an authorized person such as a serviceman for setting the present instrument for providing the desired credit accumulation in the credit accumulator described above. The switch means controlled by this control knob 262 is shown at 264 in FIG. 16 which is in the form of two separate switches ganged for conjoint actuation.

Briefly stated, actuation of the instrument 233 results in energization of the driving coil 48 and consequent advancement of the ratchet means 53. As will be recalled in the description above, energization of the coil 48 results in movement of the ratchet means 53 various amounts according to whether the stop means 52*a*, 50*a* or 120 is utilized for limiting movement of the pawl 84. The maximum movement was stated to be six increments or teeth. In the operation of the auxiliary instrument 233 the solenoid 48 may be actuated twice in a given cycle of operation of the instrument 233, to the full extent of movement of the pawl 84, namely, as limited by the stop 120 so that the amount of advancement of the ratchet means, or credit accumulation, may be twice that provided by a 25¢ piece, or twelve teeth. For example, the two projections 250*a* and 250*b* (FIG. 20) lie in a common circle concentric with the axis of the shaft 240. In a cycle of movement of the disk cams 236 and 238, these two projections 250*a* and 250*b* will successively engage the switch follower or spring finger 254*a* with resulting two separate impulses transmitted by the corresponding switch of the switch bank 252, which is connected in circuit with the solenoid 48 as shown in the circuit of FIG. 16. In this same operation, the solenoids 52 and 50 remain de-energized so that the full amount of movement of the ratchet means 53 as noted above, in the two impulses is twelve increments or teeth. This represents twelve 5¢ units, which are cancelled by playing records of total values represented by this number of 5¢ units, resulting in a bonus playing credit, comparable to that provided for insertion of a 25¢ coin as described above.

It is desired that a certain degree of flexibility be provided for setting up credit in the credit accumulator means and hence the provision of the settable switch means 264. The auxiliary credit accumulator 233 is not limited to the single instance noted above in which the solenoid 280 is energized two times, but it may be utilized for providing different numbers of impulses to that solenoid, or even to any of the other solenoids such as 52 and 50. As will be seen by the conductors of FIG. 16 leading from the switch means 264, the various solenoids 48, 52 or 50 may be actuated a desired number of times according to the setting of the control knob 262. Regardless of the amount of credit accumulated in the credit accumulator means, either under control of the credit accumulator 35 or the auxiliary instrument 233, that credit is cancelled in direct proportion to the values represented by the records played, i.e., by the standard and EP records according to their represented values, and further according to which scale of charges is utilized, i.e., whether the 10¢-15¢ scale or the 5¢-10¢ scale.

It is thought that the invention and its attendant advantages will be understood from the foregoing description, and it will be apparent that various changes may be made in the form, construction and arrangement of the parts without departing from the spirit and scope of the invention or sacrificing all of its material advantages, the forms hereinbefore described and illustrated in the drawings being merely preferred embodiments thereof.

We claim:

1. An automatic phonograph comprising a record magazine, record transferring and playing means for removing records from the magazine, playing them and returning them to the magazine, coin insert means adapted to receive coins of different denominations, credit accumulator means having a member movable in advancing and retracting directions, electrical means controlled by the insertion of a coin of each of said denominations operative for advancing said member an amount corresponding to the value of the respective inserted coin, said magazine having a plurality of pockets adapted to receive records of different value representations, control means individual to each pocket in the magazine operative in response to manual actuation thereof for effecting playing of the record in the corresponding pocket, means selectively manually positionable for controlling said individual control means according to preselected value representations of the pockets, and electrical means operative, in response to actuation of each individual control means, for moving said credit accumulator means member in retracting direction and thereby subtracting credit therefrom an amount corresponding to the value represented by the pocket corresponding to the respective individual control means.

2. An automatic phonograph comprising a record magazine having a plurality of pockets adapted to hold records of different value representations, means for removing records from the magazine, playing them and returning them to the magazine, coin insert means adapted to receive coins of each of a plurality of different denominations, credit accumulator means including a rotatable member movable in advancing and retracting directions, electrical means responsive to insertion of a coin of any of said denominations for moving said rotatable member in advancing direction an amount corresponding to the value of the respective coin inserted, said electrical means including a solenoid having a plunger engageable with said rotatable member, control means individual to each of the pockets in the magazine operative in response to manual actuation thereof for effecting playing of means selectively manually positionable for controlling said individual control means according to pre-selected value representations of the pockets, electrical means responsive to actuation of any of said individual control means operative for moving said rotatable member in retracting direction an amount corresponding to the value represented by the respective pocket, said last named electrical means including a solenoid having a plunger engageable with said rotatable member, said credit accumulator means also including latch means normally retaining said rotatable member in set position but releasable in response to forces applied to the rotatable member by said solenoids.

3. An automatic phonograph comprising a magazine adapted to hold records of different value representations, operating means for removing records from the magazine, playing them and returning them to the magazine, coin insert means having portions adapted for receiving coins of a plurality of different denominations, credit accumulator means including a movable member having a home position and movable therefrom in advancing direction and in return thereto in retracting direction, switch means controlled by said movable member for energizing said operating means when in advanced positions and de-energizing it when in home position, means responsive to insertion of a coin of any of said denominations in the coin insert means for transmitting a pulse to the movable member of the credit means for moving it in a single movement in advancing direction, means responsive to insertion of a coin of lesser value than the highest of said denominations for limiting the movement of said movable member to an amount less than the maximum amount which the member is capable of moving and to an amount corresponding to the value of the respective coin, individual control means for each record in the magazine, each said control means having control characteristics according to the value representation of the corresponding record, means responsive to playing any of the records in the magazine for transmitting a pulse to the credit means for moving the movable member thereof a predetermined amount in retracting direction, and means responsive to playing a record of less than the highest value representation for limiting movement of the movable member in retracting direction to an amount less than the maximum amount which the member is capable of moving and to an amount corresponding to the value represented by the respective record.

4. An automatic phonograph comprising a magazine adapted to hold a plurality of records of different value representations, operating means for removing records from the magazine, playing them, and returning them to the magazine, coin insert means adapted to receive coins of different-denominations, credit means including a rotatable ratchet having a home position and movable therefrom in advancing direction and in return thereto in retracting direction, switch means operative for controlling said operating means when the ratchet is in advanced position, latch means for normally and releasably retaining the ratchet means in set position against movement in either direction, an advancing solenoid having a plunger engageable with the ratchet and adapted to move it in advancing direction a predetermined amount, electrical means operable in response to insertion of a coin of any of said denominations in said coin insert means for energizing said solenoid, limiting solenoids having plungers projected on energization of the respective solenoids for limiting movement of the plunger of the advancing solenoid and thereby movement of the ratchet means, electrical means responsive to insertion of coins of values less than the highest of said denominations for energizing respective ones of said limiting solenoids for limiting movement of the ratchet means to amounts corresponding to the respective values of said lesser value coins, a retracting solenoid having a plunger engageable with said ratchet means and operable in response to energization of its solenoid for moving the ratchet in retracting direction, second limiting solenoids including plungers projectable to positions for limiting the amount of projection of the plunger of the retracting solenoid, individual control means for controlling playing of each of said records, electrical means operative in response to operation of any of said individual control means for energizing said retracting solenoid, and electrical means operative in response to operation of said individual control means corresponding to those of said records representing less than maximum value for energizing said second limiting solenoids corresponding to the respective values of said lesser value records.

5. The invention set out in claim 4 in which said ratchet means has a range of movement greater than that represented by the largest of said denominations of coins, whereby to enable setting up credit in said credit means to an amount greater than that represented by the largest of said denominations of coins.

6. An automatic phonograph comprising a magazine adapted to hold records of different value representations, operating means for removing records from the magazine, playing them and returning them to the magazine, selection means for controlling said operating means and including individual control elements for the respective records, said selection means being alternatively conditionable according to different values represented by said records, and actuation of said individual control elements being effective for causing playing of selected records within a range of value representations according to the condition of the selection means, credit accumulator means including a member having a home position and movable therefrom in advancing direction and in return thereto in retracting direction, circuit means for energizing said operating means when said member is in advanced position and de-energizing it when in home position, coin insert means adapted to receive coins of different denominations, means responsive to insertion of coins in said coin insert means for moving said movable member of the credit accumulator means in advancing direction an amount corresponding to the value of the coin inserted and thereby establishing a corresponding credit, means for visually indicating the amount of credit established in said credit accumulator means, and means controlled by the condition of said selection means for disabling the individual control elements corresponding to records representing greater value than that indicated by said visually indicating means and enabling all those corresponding to records representing values equal to and less than the amount indicated thereby.

7. The invention set out in claim 6 in which said selection means includes a member movable to different positions corresponding to the respective ones of said conditions of the selection means for presenting to view indications of those records for which the operating and playing means are energized.

8. An automatic phonograph comprising a magazine having a plurality of pockets adapted to hold records of different value representations, operating means for removing records from the magazine, playing them and returning them to the magazine, credit accumulator means including a member having a home position and movable therefrom in advancing direction and in return thereto in retracting direction, coin insert means adapted to receive coins of different denominations, means responsive to insertion of any coin in the coin insert means for advancing said movable member an amount corresponding to the value of the inserted coin, control means individual to the pockets in the magazine for controlling playing of the records in the respective pockets, means selectively manually positionable for controlling said individual control means according to pre-selected value representations of the pockets, switch means for each value represented by the records, said movable member being operative for operating said switch means at positions of advancement corresponding to the different values of coins inserted and thus at positions corresponding respectively with the different values represented by the records, and means controlled by said control means responsive to playing the records for moving said movable member in retracting direction amounts corresponding to the values represented by the respective pockets.

9. The invention set out in claim 8 in which adjusting means is provided for effecting operation of the respective switches at different positions of advancement of said movable member whereby to effect playing of selected records within the several represented values in response to deposit of a coin of a given value.

10. The invention set out in claim 8 in which means is provided for manually selectively predetermining which groups of records are controlled by the respective switch means.

11. The invention set out in claim 8 in which said movable member has a pair of actuating elements for actuating said switches, a first one of which has a predetermined position and the second of which is adjustably positionable for operation selectively before or after the first one in the direction of linear travel of the member, and reversible circuit means is provided between said switches and individual control elements whereby to effect selection of greater-value and lesser-value records by said actuating elements serially in the order of those elements relative to linear travel of the member according to the setting of said second one of the elements.

12. The invention set out in claim 11 in which said one actuating element is positioned in a position representing two increments of movement of said movable member of the credit accumulator means from home position and corresponding value of coin, and said second actuating element is adjustably positionable in a first position representing one increment and a second position representing three increments, respectively, of movement of said movable member from home position, and corresponding respective values, whereby the minimum value represented by a record can be made to correspond selectively with one increment or two increments of movements of said movable member according to whether said second actuating element is in its first or second position respectively.

13. An automatic phonograph comprising a magazine adapted to hold records of different value representations, means for playing records that are held in the magazine, coin insert means adapted to receive coins of different denominations, a circuit portion corresponding to each value represented by the records for controlling the playing means for playing the records representing that value, a credit indicating member having a home position and movable therefrom in advancing direction and in return thereto in retracting direction, and being so movable in predetermined increments, said indicating member being operative for energizing said circuit portions when in predetermined advanced positions, means responsive to insertion of a coin of any of said denominations in the coin insert means for advancing the indicating member a number of increments corresponding to the value of the inserted coin, one increment of movement of the indicating member corresponding to the minimum value coin receivable in the coin insert means, means for adjusting said member for varying the positions of advancement thereof in which it energizes said circuit portions, control means for each record having control characteristics according to the value representation of that record responsive to playing the corresponding record for moving the credit member in retracting direction an amount corresponding to the value represented by the respective record, and manually actuated control means cooperative with said circuit portions for controlling the playing of the records in the magazine.

14. The invention set out in claim 13 in which said indicating member is adjustable so as to be operative for energizing said circuit portions when it has been advanced a different number of increments, respectively, and means is provided for visually indicating the amount of credit established by the indicating member according to the position of advancement of the member independently of the adjustment setting of the indicating member.

15. An automatic phonograph comprising a magazine adapted to receive records of a plurality of different value representations, operating means for removing records from the magazine, playing them, and replacing them in the magazine, first coin insert means adapted to receive coins of different denominations, a credit representing member having a home position and movable therefrom in advancing direction and in return thereto in return direction, means operative in response to insertion of a coin of any of said denominations for advancing said credit representing member an amount corresponding to the respective coin, manually actuated means for controlling said operating means for playing records, control means for each record having control characteristics according to the value representation of that record operative in response to playing a record for retracting said credit member an amount corresponding to the value represented by the respective record, an auxiliary credit accumulator means including second coin insert means, and means operative in response to insertion of a coin in said second coin insert means for actuating said advancing means in a plurality of pulses whereby to advance said credit representing member an amount greater than that normally advanced by said advancing means.

16. The invention set out in claim 15 in which the credit accumulator means has a credit representing member, the means for advancing that member so advances it in a single pulse in response to insertion of a coin, and the auxiliary credit accumulator means operates to energize said advancing means a plurality of times, and thereby advances said member a corresponding number of times, in response to insertion of a single coin in the coin insert means of the auxiliary credit accumulator means.

17. The invention set out in claim 15 in which the credit accumulator means includes a credit representing member and solenoid means for advancing that member, and the auxiliary credit accumulating means includes cam means movable through a predetermined cycle in response to insertion of a coin in the auxiliary credit accumulating means, switch means is provided for energizing said solenoid means, and the cam means is operative for actuating said switch means a plurality of times in a cycle of operation thereof.

References Cited in the file of this patent

UNITED STATES PATENTS

| | | |
|---|---|---|
| 2,545,117 | Starnes | Mar. 13, 1951 |
| 2,586,173 | Nelsen | Feb. 19, 1952 |
| 2,616,705 | Leonard | Nov. 4, 1952 |